Patented May 23, 1950

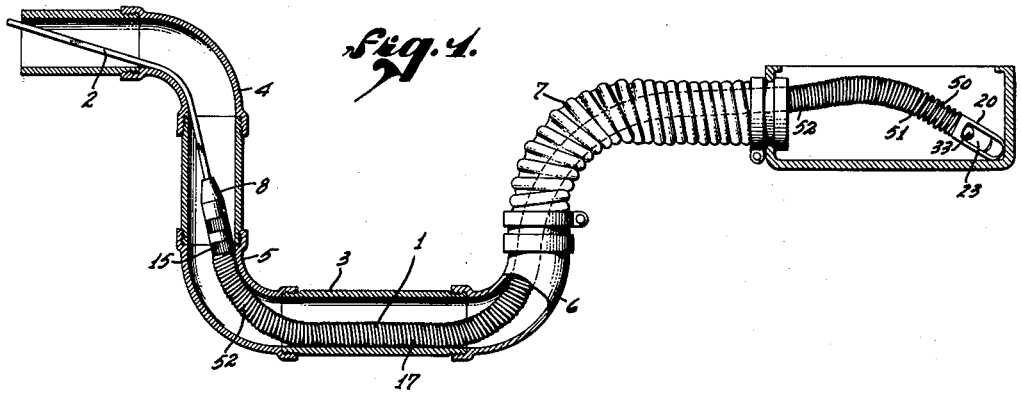
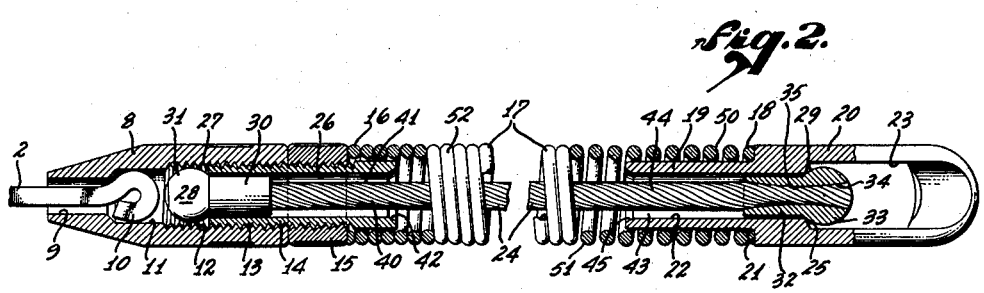
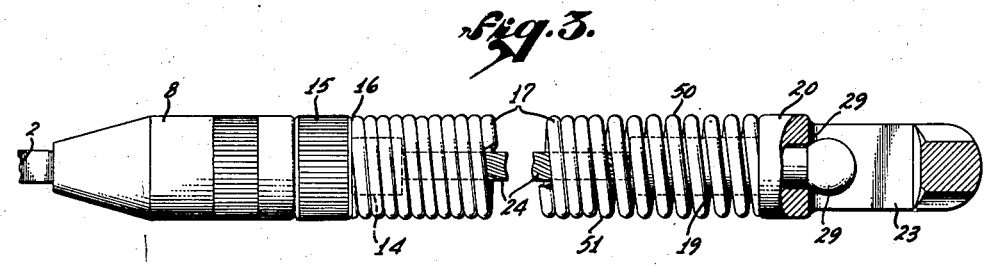
INVENTOR:
WILL CLAUDE JORDAN
BY
ATTORNEY.

2,509,100

UNITED STATES PATENT OFFICE 2,509,100

FISH TAPE LEADER

Will Claude Jordan, Burbank, Calif.

Application December 23, 1947, Serial No. 793,456

6 Claims. (Cl. 175—376)

The invention relates to a fish tape leader for fishing electric wires through a conduit.

More particularly, the invention relates to a fish tape leader having certain improvements over the fish tape leader described and claimed in application Serial Number 683,554 filed jointly by applicant and William H. Wait on July 13, 1946 for Fish tape leader.

As disclosed and claimed in said patent application, means are provided for attaching to the end of the tape a flexible leader which is preferably more flexible than the tape. The leader is relatively short, i. e. of the order of fifteen inches, whereas the tape may be twenty-five or more feet in length depending upon the length of the conduit.

Also according to said patent application, the leader comprises a coil compression spring surrounding a cable extending between a head and a tail piece, the head having means for securing the electric wire and the tail piece having a swivel coupling for the end of the fish tape. The spring is held under compression by the head and the tail piece. In going around bends in the conduit, the leader is subjected to flexure and the repeated flexing has a tendency to cause the cable to break at its junctures with the head and with the tail piece.

A particular object of the present invention is to reduce or prevent the tendency of the cable to crystallize and break at its ends where it is joined to the head and the tail piece. This is is accomplished by swaging on each end of the cable an abutment preferably in the form of a ball to resist outward movement of the head and the tail piece to hold the coil spring under compression, while providing lateral play of the cable in the head and tail piece to reduce sharp bends in the cable when the leader goes around a bend in the conduit.

For further details of the invention, reference may be made to the drawings wherein Fig. 1 is a view in elevation of a typical conduit, partly in section, showing the improved leader of this invention in the conduit after it has been pushed to the far end thereof and ready to have the electric wires attached thereto for pulling them through the conduit.

Fig. 2 is an enlarged longitudinal sectional view, partly in full lines, of the fish tape leader of Fig. 1 with the central portion of the leader broken away.

Fig. 3 is an enlarged plan view of the leader of Fig. 2, with the tape removed, with the central portion of the leader broken away and with the head rotated ninety degrees from the portion shown in Fig. 2 and shown in section.

Referring in detail to the drawings, the leader 1 of this invention forms the terminal portion of a steel fish tape 2. The size of the tape may be .060 inch by ⅛ inch. The leader 1 is more flexible than the tape 2 as shown by actual test, whereby it is more readily pushed through a conduit 3 having a number of bends indicated at 4, 5, 6, and 7.

While other materials and dimensions may be employed, all parts of the leader 1 are preferably of metal and, for example, it may be about fifteen inches long and have a substantially uniform outside diameter of about ⅜ inch. The leader is therefore short in comparison to the length of the fish tape.

The tape 2 is secured to the leader 1 by removing the tail piece 8, by extending the straight tape through the cylindrical bore 9, from left to right as seen in Fig. 2, by bending over the end of the tape to enlarge it as indicated at 10, keeping the size of the enlargement 10 small enough so that it will swivel in the enlarged bore 11. The tape 2 can thus swivel or turn with respect to the leader 1 and vice versa, which facilitates pulling electric wires through the conduit as the fish tape 2 can rotate or twist in going around bends without causing a twist in the wires pulled.

As the leader is more flexible than the tape, when the tape is pushed forward, the leader will pass along a reverse bend or offset easier than the tape, as the tape has to twist or turn at such locations. Without the leader, the tape does not twist or turn readily as the spring action of the tape forces one of its flat sides against the side of the conduit.

As shown in Fig. 2, the tail piece 8 is in the form of a hollow nut having internal screw threads 12 which mate with external threads 13 on a hollow bolt 14. The bolt 14 also has a lock nut 15 against which bears one end 16 of a compression spring 17. The other end 18 of the spring 17 fits around the shank 19 of the head 20 and bears against a shoulder 21 on the head 20. The head 20 has an axial bore 22 and at its outer end, it has a shoulder 25, also a slot 23 to serve as an eye to which the electric wires are fastened.

The spring 17 is a coil or helical spring and coaxial therewith is a steel cable 24, one end of which extends through the bore 22 in the head 20, and its other end extends through the bore 26 in the bolt 14. The outer end 27 of bolt 14 has a shoulder for an abutment 28 on the adjacent end of the cable 24, and a similar abutment 29 at the other end of the cable 24 bears against the shoulder 25 on the head 20.

The abutments 28 and 29 are formed as follows. The abutment 28 has a shank 30 and a ball or spherical head 31 and similarly the abutment 29 has a shank 32 and a ball or spherical head 33. Each of the abutments 28 and 29 has a through bore like bore 34 as shown for the abutment 29, the bores like 34 originally being uniform and of substantially the same size as the cable 24. The abutments like 28 and 29 are made in a screw machine of solid stainless steel stock machined to form the ball and shank as shown, and drilled to provide the bore. The fittings thus made are slipped onto one end of the cable 24 and swaged in a punch press or the like, the swaging being applied both to the shank and to the ball whereby they are internally upset to interlock with and grip into the cable as indicated at 35. It will be apparent that after swaging the ball like 33 and its shank 19 on one end of the cable, the cable is threaded through the head 20 of the bolt 14 before swaging the other ball 31 and its shank 30 on the cable. Thereafter the remaining parts of the leader can be assembled as shown in Fig. 2 in an obvious manner.

The shank 30 extends into and is slightly less in diameter than the bore 26, while the shank 32 extends into and is slightly less in diameter than the bore 22. The cable is thus connected to both the head 20 and the tail piece 8 (or more particularly the bolt 14) by a swivel coupling as the balls 31 and 33 can turn on their shoulders, 27 and 25.

The inner portion 40 of the cable inwardly of the shank 30 and within the bolt 14 is of smaller size than the bore 26 as indicated at 41, providing a space for some free play between the cable and the bolt 14, which permits the portion 40 of the cable 23 to laterally move and bend in a broader curve than would be the case if the cable were rigidly fastened to the full length of the bolt 14. To further facilitate the cable to bend around the inner end of bolt 14, the inner end of bore 26 preferably has a flare 42. The construction just described also is provided for the head 20, as the space 43 between the inner portion 44 of the cable and the shank 19 permits the cable to laterally move with respect to the shank 19, and the latter at its inner end has a flare 45 to make it possible for the cable to bend on a broader curve than would otherwise be the case as above explained.

Preferably the spring 17 has its coils spaced apart as indicated at 50 in Fig. 2 where the spring surrounds the shank 19 and slightly therebeyond as indicated at 51, while the coils are closely spaced adjacent to each other throughout the remainder of the length of the spring as indicated at 52.

The length of spring 17 is such that when the parts are assembled as shown in Fig. 2, the spring 17 is under compression, and hence while the lock nut 15 prevents the tail piece 8 from twisting off of bolt 14 or from coming loose, the compression of spring 17 against lock nut 15 assists in jamming the lock nut 15. As lock nut 15 is adjustable, the amount of compression of spring 17 is likewise adjustable. The force of compression of spring 17 is resisted by and puts an equal force of tension on cable 24 to impart rigidity to the leader, as nut 15 is on hollow bolt 14, the outer end 27 of which has a shoulder urging ball 28 on the cable in one direction, while the head 20 has a shoulder 25 urging ball 29 in the opposite direction.

Repeated tests have shown that the cable has little or no tendency to break at the inner ends of the head 20 or bolt 14 when flexed repeatedly in the course of going around bends in the conduit.

Various modifications may be made in the invention without departing from the spirit of the following claims. For example, the shanks 30 and 32 may be omitted and a tubular fitting may be used instead of the balls 31 and 33, the inner end of each such fitting bearing against the shoulders 25 and 27 and each such fitting being swaged on the end of the cable. However, the construction shown in Fig. 2 is preferred as it provides a longer and stronger grip on the cable and the balls are small in diameter, leaving plenty of room in the head 20 to fasten the electric wires, and plenty of room for the enlarged end 10 on the fish tape to swivel in the bore 11.

I claim:

1. In a leader for a fish tape wherein a cable extends between a head and a tail piece with a compression spring surrounding the cable and extending between the head and tail piece, said spring having open turns, the combination with said head and tail piece of a bore therethrough larger than said cable, an abutment at each end of said cable with cooperating shoulders therefor respectively on said head and tail piece, said bores providing a space for lateral play of said cable when the leader is flexed, separate means associated with said head and said tail piece and cooperating with said abutments and shoulders for holding said spring under compression with corresponding tension in said cable.

2. In a leader according to claim 1 wherein each of said abutments is a hollow ball having a through bore internally upset and interlocked with the cable.

3. In a leader according to claim 1 wherein each of said abutments comprises a ball having a tubular fitting internally upset around and interlocked with the cable, each fitting comprising a shank located in the outer end of one of said bores and shorter than said bore, said head and said tail piece each having a flare opposite said cable at the inner end of its bore.

4. A leader for a fish tape, said leader comprising a head having an axial bore, a bolt having an axial bore, a cable having opposite ends each extending through one of said bores, said cable being smaller in size than said bores, an abutment fixed on each end of said cable and cooperating shoulders therefor respectively on said head and said bolt, a fish tape coupling device having threads for said bolt, and a coil compression spring around said cable and extending between said head and said coupling device, said spring having open turns and being held under compression by said cable in conjunction with said abutments and shoulders.

5. A leader according to claim 4 wherein each of said abutments is a hollow ball embracing the cable.

6. A leader according to claim 4 wherein said leader is of the order of 15 inches long and more flexible and shorter than said tape, said bolt having a hollow nut having a bore enlarged inwardly of its outer end and forming a swivel socket for an upset end of the tape, said nut extending over the outer end of said bolt and over the shoulder for said bolt and cooperating abutment on the cable and a lock nut on said bolt forming an abutment for one end of said spring.

WILL CLAUDE JORDAN.

REFERENCES CITED

The following references are of record in the file of this patent:

UNITED STATES PATENTS

| Number | Name | Date |
|---|---|---|
| 400,958 | Seely | Apr. 9, 1889 |
| 1,108,025 | Thies | Aug. 18, 1914 |
| 1,638,766 | Grosvold | Aug. 9, 1927 |

FOREIGN PATENTS

| Number | Country | Date |
|---|---|---|
| 134,717 | France | Jan. 24, 1880 |